United States Patent
Kim et al.

(10) Patent No.: US 12,318,911 B2
(45) Date of Patent: Jun. 3, 2025

(54) FILM PEELING APPARATUS AND FILM PEELING METHOD USING THE SAME

(71) Applicant: Samsung Display Co., Ltd., Yongin-si (KR)

(72) Inventors: Dongwoo Kim, Seoul (KR); Sanghoon Park, Yongin-si (KR); Jong-Hoon Park, Asan-si (KR); Myunggil Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 175 days.

(21) Appl. No.: 17/953,677

(22) Filed: Sep. 27, 2022

(65) Prior Publication Data

US 2023/0117501 A1 Apr. 20, 2023

(30) Foreign Application Priority Data

Oct. 18, 2021 (KR) .................. 10-2021-0138556

(51) Int. Cl.
*B25J 11/00* (2006.01)
*B25J 9/00* (2006.01)
*B25J 9/16* (2006.01)
*B25J 15/00* (2006.01)

(52) U.S. Cl.
CPC .......... *B25J 11/005* (2013.01); *B25J 9/0009* (2013.01); *B25J 9/1612* (2013.01); *B25J 9/1694* (2013.01); *B25J 15/0028* (2013.01)

(58) Field of Classification Search
CPC ............................. B29J 11/005; B25J 15/0028
See application file for complete search history.

(56) References Cited

U.S. PATENT DOCUMENTS 7,207,241 B2 * 4/2007 Itoh .................... B67B 7/40
81/3.2

FOREIGN PATENT DOCUMENTS

| CN | 111907846 A | * | 11/2020 | ............. B65B 69/00 |
|----|----|----|----|----|
| JP | 05-18062 U | * | 3/1993 | |
| JP | 2009233988 A | * | 10/2009 | |
| JP | 2010042922 A | * | 2/2010 | |
| JP | 6442459 B2 | * | 12/2018 | |
| KR | 101119571 B1 | | 3/2012 | |
| KR | 2013051367 A | * | 5/2013 | ............. B29C 41/00 |
| KR | 1020130051367 A | | 5/2013 | |
| KR | 101566956 B1 | | 11/2015 | |

(Continued)

OTHER PUBLICATIONS

Machine translation KR20130051367A (Year: 2013).*

(Continued)

*Primary Examiner* — Jacob T Minskey
*Assistant Examiner* — Wayne K. Swier
(74) *Attorney, Agent, or Firm* — CANTOR COLBURN LLP (57) ABSTRACT

A film peeling apparatus for peeling a film from an object includes a peeling module including a first frame, a second frame connected to the first frame and including a rotation body and a gripper which grips the film attached to the object and to be removed from the object, and is rotatable about a rotation axis of the rotation body connecting the first frame and the gripper, and a third frame defining a boundary at which the film to be removed is peeled from the object, and an articulated robot including an articulated arm connected to the first frame.

9 Claims, 12 Drawing Sheets

(56) References Cited

FOREIGN PATENT DOCUMENTS

| | | |
|---|---|---|
| KR | 101593567 B1 | 2/2016 |
| KR | 101765297 B1 | 8/2017 |
| KR | 1020170103056 A | 9/2017 |
| KR | 101947740 B1 | 2/2019 |
| KR | 1020200111708 A | 9/2020 |

OTHER PUBLICATIONS

Machine translation KR20200111708A (Year: 2020).*
Machine translation CN111907846A (Year: 2020).*
Machine translation JPH0518062U (Year: 1993).*
Machine translation JP2009233988A (Year: 2009).*
Machine translation JP2010042922A (Year: 2010).*
Machine translation JP6442459B2 (Year: 2018).*
Machine translation KR101947740B1 (Year: 2019).*

* cited by examiner

FIG. 14

FILM PEELING APPARATUS AND FILM PEELING METHOD USING THE SAME

This application claims priority to Korean Patent Application No. 10-2021-0138556, filed on Oct. 18, 2021, and all the benefits accruing therefrom under 35 U.S.C. § 119, the content of which in its entirety is herein incorporated by reference.

BACKGROUND

1. Field

Embodiments of the invention relate to a film peeling apparatus and a film peeling method using the film peeling apparatus

2. Description of the Related Art

In order to protect respective parts during a manufacturing process of a display device, the display device may be transported with a protective film attached thereto. At this time, the protective film is desired to be removed in order to couple the respective parts to each other. When the protective film is removed, no damage to respective parts is desired while avoiding foreign substances around the protective film.

Recently, the display device has been produced to have a curved shape. Therefore, when removing the protective film, considerable attention is desired to prevent damage to the respective parts.

SUMMARY

Embodiments of the invention provide a film peeling apparatus performing a peeling process.

Embodiments of the invention also provide a film peeling method using the film peeling apparatus.

Additional features of the inventions will be set forth in the description which follows, and in part will be apparent from the description, or may be learned by practice of the inventions.

In an embodiment of the invention, a film peeling apparatus for peeling a film from an object includes a peeling module including a first frame, a second frame connected to the first frame and including a rotation body and a gripper which grips the film attached to the object and to be removed from the object, and is rotatable about a rotation axis of the rotation body connecting the first frame and the gripper, and a third frame defining a boundary at which the film to be removed is peeled from the object to be removed, and an articulated robot including an articulated arm connected to the first frame.

In an embodiment, the articulated robot may move the peeling module along a preset path.

In an embodiment, the second frame may rotate about the rotation axis to wind the film around the gripper when the gripper grips the film.

In an embodiment, when viewed from a top of the peeling module, the third frame may be spaced apart from the second frame in a first direction perpendicular to the rotation axis, and when viewed from a front of the peeling module, the third frame may be movable in a second direction perpendicular to the first direction and facing the film and in a third direction opposite to the second direction.

In an embodiment, the third frame may include a roller which presses the film, and the roller is in rolling contact with the film.

In an embodiment, the third frame may include a curved surface which presses the film, and the curved surface may be in sliding contact with the film.

In an embodiment, the film peeling apparatus may further include a fourth frame connected to the first frame and disposed between the second frame and the third frame. Also, when viewed from the top of the peeling module, the fourth frame may be movable in a fourth direction parallel to the rotation axis and away from the first frame and in a fifth direction opposite to the fourth direction.

In an embodiment, when viewed from the top of the peeling module, the fourth frame may move in the fourth direction to separate the film wound around the gripper of the second frame from the gripper.

In an embodiment, the second frame may further include a first sensor which detects whether the gripper is gripped, and the fourth frame may include a second sensor which detects whether the gripper and the film are separated.

In an embodiment, the film peeling apparatus may further include a controller which is electrically connected to each of the peeling module, the articulated robot, the first sensor, and the second sensor, and controls an operation of the peeling module and the articulated robot.

In an embodiment of the invention, a film peeling method includes assembling a peeling module including a first frame, a second frame connected to the first frame and including a rotation body and a gripper which grips the film attached to the object and to be removed from the object, and rotatable about a rotation axis connecting the first frame and the gripper, and a third frame defining a boundary at which the film to be removed is peeled from the object, and connecting the first frame to an articulated arm included in an articulated robot.

In an embodiment, the film peeling method may further include gripping the film attached to the object and to be removed by the gripper of the second frame.

In an embodiment, when viewed from a top of the peeling module, the third frame may be spaced apart from the second frame in a first direction perpendicular to the rotation axis, and when viewed from a front of the peeling module, the third frame may be movable in a second direction perpendicular to the first direction and facing the film and in a third direction opposite to the second direction.

In an embodiment, the third frame may include a roller which presses the film, and the roller may be in rolling contact with the film.

In an embodiment, the film peeling method may further include winding the film around the gripper by rotating the second frame about the rotation axis, when viewed from the front of the peeling module, moving the third frame in the second direction to make rolling contact with the film, and moving the peeling module to a preset path by the articulated robot.

In an embodiment, the peeling module may further include a fourth frame connected to the first frame and disposed between the second frame and the third frame, and when viewed from the top of the peeling module, the fourth frame may be movable in a fourth direction parallel to the rotation axis and away from the first frame and in a fifth direction opposite to the fourth direction.

In an embodiment, the film peeling method may further include when viewed from the top of the peeling module, separating the film wound around the gripper of the second frame from the gripper by moving the fourth frame in the fourth direction.

In an embodiment, the third frame may include a curved surface pressing the film, and the curved surface may be in sliding contact with the film.

In an embodiment, the peeling module may further include a fourth frame connected to the first frame and disposed between the second frame and the third frame, and when viewed from the top of the peeling module, the fourth frame may be movable in a fourth direction parallel to the rotation axis and away from the first frame and in a fifth direction opposite to the fourth direction.

According the film peeling apparatus and method in embodiments of the invention, the peeling module may include the first frame, the second frame, the third frame, and the fourth frame. the first frame may be connected to each of the second frame, the third frame, and the fourth frame. The second frame may include the gripper. The second frame may wind the film around the gripper. In addition, the third frame may define a boundary at which the film is peeled from the object to be removed. In addition, the articulated robot may move the peeling module to the preset path. Accordingly, a footprint desired for a peeling process may be reduced.

In an embodiment, the fourth frame may remove the film wound around the gripper.

In an embodiment, the object to be removed may include a planar area and a curved area. In this case, the path through which the articulated robot moves the peeling module may include a first path corresponding to the flat area and a second path corresponding to the curved area. Accordingly, a peeling process suitable for the shape of the object including a curved area may be performed. Accordingly, it is possible to reduce damage to the object to be removed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventions.

DETAILED DESCRIPTION

Illustrative, non-limiting embodiments will be more clearly understood from the following detailed description in conjunction with the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Figure 1:
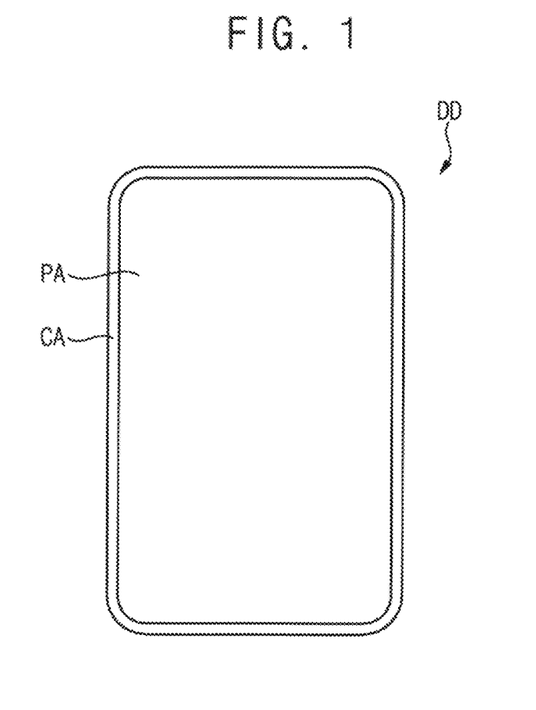
FIGS. 1 and 2 are views illustrating an embodiment of display devices according to the invention.
Figure 2:
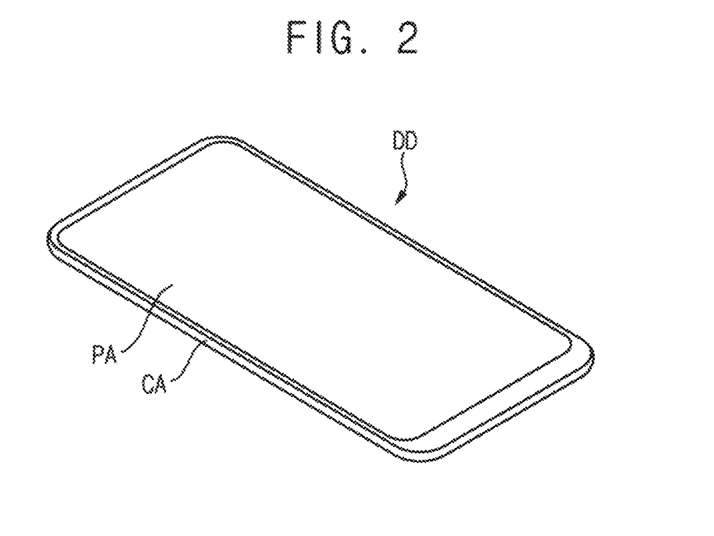

FIGS. 1 and 2 are views illustrating an embodiment of display devices according to the invention.

Hereinafter, an embodiment of a display device will be first described to describe a film, but the invention is not limited thereto.

Referring to FIGS. 1 and 2, a display device DD may include a planar area PA and a curved area CA. The display device DD may be manufactured in various forms. In an embodiment, the display device DD may be manufactured in such a way that the curved area CA is formed or provided perpendicular to the planar area PA, for example. Also, the curved area CA may be manufactured to have a curvature and protrude to the outside of the display device DD.

The planar area PA may be positioned on an upper surface of the display device DD and on a rear surface of the display device DD. A plurality of pixels may be disposed in the planar area PA. The display device DD may display an image through the planar area PA.

The curved area CA may be connected to the planar area PA. The curved area CA may be disposed along an edge of the display device DD between the upper surface of the display device DD and the rear surface of the display device DD. In an embodiment, the curved area CA may include first to fourth side surfaces, and an image may be displayed on the first to fourth side surfaces as well. To this end, a plurality of pixels may also be disposed in the curved area CA.

The curved area CA may connect the upper surface of the display device DD and the rear surface of the display device DD. In some embodiments, the curved area CA may have various shapes. In an embodiment, an area of a top surface of the display device DD may be smaller than an area of a rear surface of the display device DD, for example. In this case, the curved area CA may have a predetermined inclination and connect the upper surface of the display device DD and the rear surface of the display device DD. In this case, the curved area CA may have a curvature and connect the upper surface of the display device DD and the rear surface of the display device DD.

In an alternative embodiment, for example, an area of the top surface of the display device DD may be the same as an area of the rear surface of the display device DD and may overlap each other. In this case, the curved area CA may be disposed perpendicular to the top surface of the display device DD and the rear surface of the display device DD to connect the top surface of the display device DD and the rear surface of the display device DD. In an alternative embodiment, the curved area CA may connect the top surface of the display device DD and the rear surface of the display device DD with a center protruding outward of the display device DD.

The display device DD may include various components therein. At least some of the components may have the same shape as that of the display device DD. In an embodiment, a window, a display panel or the like may have the same shape as that of the display device DD, for example. Accordingly, the window and the display panel may also include a planar area and a curved area like the display device DD. A film (e.g., a protective film) may be attached to the window, the display panel or the like. The film may serve to protect the window, the display panel, or the like from an external impact in a process of manufacturing the display device DD. In an embodiment, the film may protect the window and the display panel from external scratches in a process of transporting the window and the display panel, for example.

However, the film is desired to be removed in a process of bonding the window, the display panel, or the like. Accordingly, a film peeling apparatus for removing the film from the window, the display panel, or the like, and a film peeling method using the same will be described below.

Figure 3:
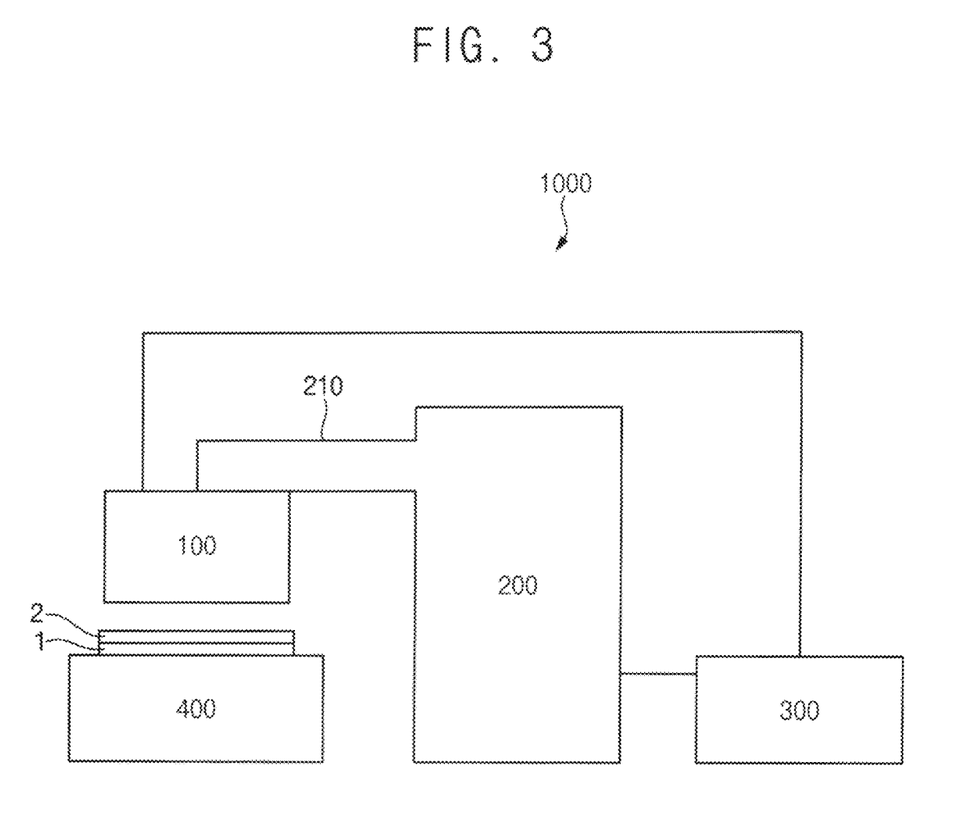
FIG. 3 is a view illustrating an embodiment of a film peeling apparatus according to the invention.

FIG. 3 is a view illustrating an embodiment of a film peeling apparatus according to the invention.

Referring to FIG. 3, a film peeling apparatus 1000 in an embodiment of the invention may include a peeling module 100, an articulated robot 200, a controller 300, and a stage 400.

The peeling module 100 may be an assembly assembled for peeling the film 2 which is attached to an object 1 and to be removed from the object 1. The peeling module 100 may be connected to the articulated robot 200.

The controller 300 may be electrically connected to each of the peeling module 100 and the articulated robot 200, and may control an operation of the peeling module 100 and the articulated robot 200.

The stage 400 may be disposed below the peeling module 100. In addition, the object 1 to which the film 2 to be removed is attached may be disposed on the stage 400. The object 1 from which the film 2 is to be removed may include the aforementioned the window, the display panel, or the like. In an embodiment, the film 2 may include a protective film for protecting the window, the display panel, or the like from an external impact while the display panel is transported.

Figure 4:
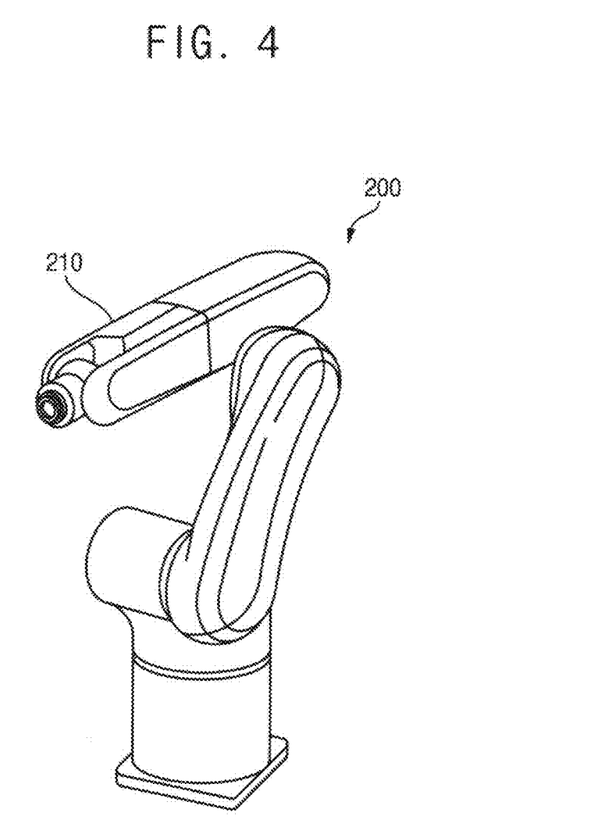
FIG. 4 is a view illustrating an embodiment of an articulated robot included in the film peeling device of FIG. 3.

FIG. 4 is a view illustrating an embodiment of an articulated robot included in the film peeling device of FIG. 3.

Referring to FIG. 4, the articulated robot 200 may include an articulated arm 210.

The articulated robot 200 may have a plurality of joints. Accordingly, the articulated robot 200 may move similarly to a human movement. In an embodiment, as illustrated in FIG. 2, the articulated robot 200 may be a six-axis articulated robot having six rotational axes. However, a shape of the articulated robot 200 and the number of rotation axes are not limited by FIG. 4. In an embodiment, the articulated robot 200 may be a 5-axis articulated robot, for example.

Figure 5:
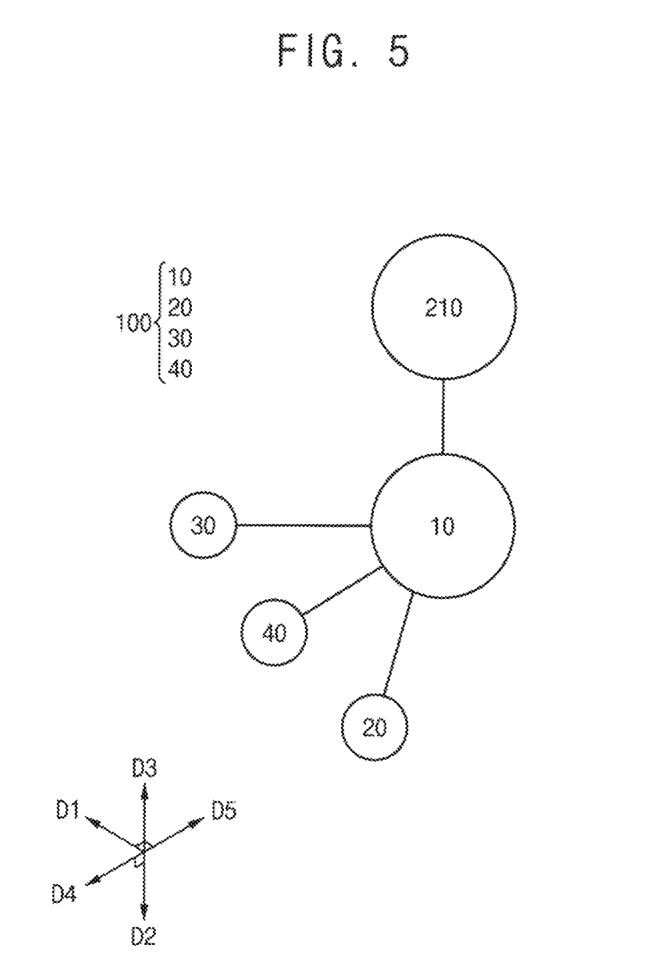
FIG. 5 is a view for explaining a peeling module included in the film peeling apparatus of FIG. 3

FIG. 5 is a view for explaining a peeling module included in the film peeling apparatus of FIG. 3

Referring to FIGS. 3 to 5, the peeling module 100 may include a first frame 10, a second frame 20, a third frame 30, and a fourth frame 40.

The first frame 10 may be a basic skeleton of the peeling module 100. In addition, each of the second frame 20, the third frame 30, and the fourth frame 40 may be connected to the first frame 10. The second frame 20, the third frame 30, and the fourth frame 40 will be described in detail with reference to FIGS. 6 to 10.

The first frame 10 may be connected to the articulated arm 210 of the articulated robot 200. Accordingly, the peeling module 100 may be constrained to the articulated robot 200. The articulated robot 200 may move the peeling module 100 along a preset path 220. A detailed description thereof will be given with reference to FIGS. 11 to 13.

Figure 6:
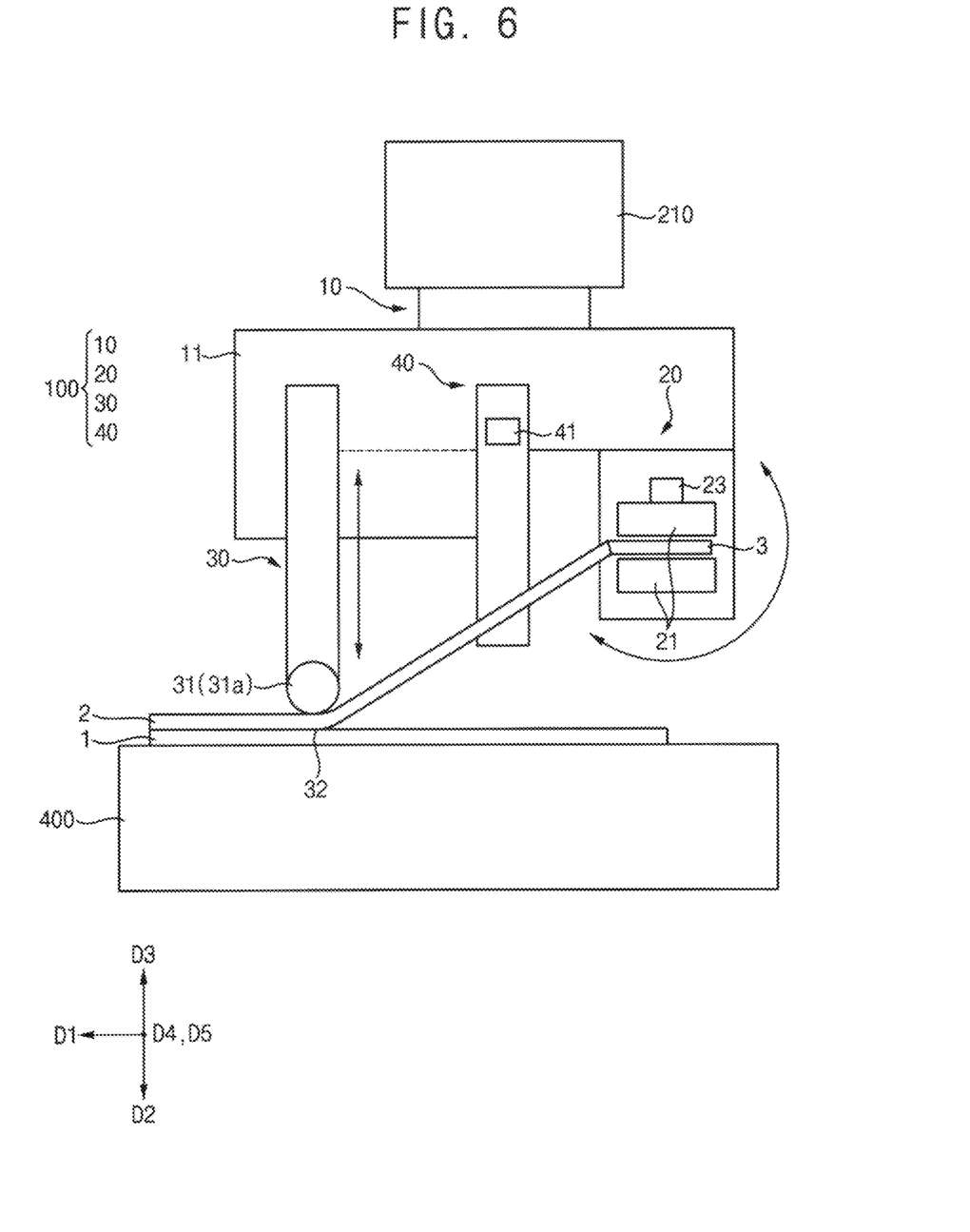
FIGS. 6 and 7 are front views illustrating an embodiment of the peeling module of FIG. 5.
Figure 7:
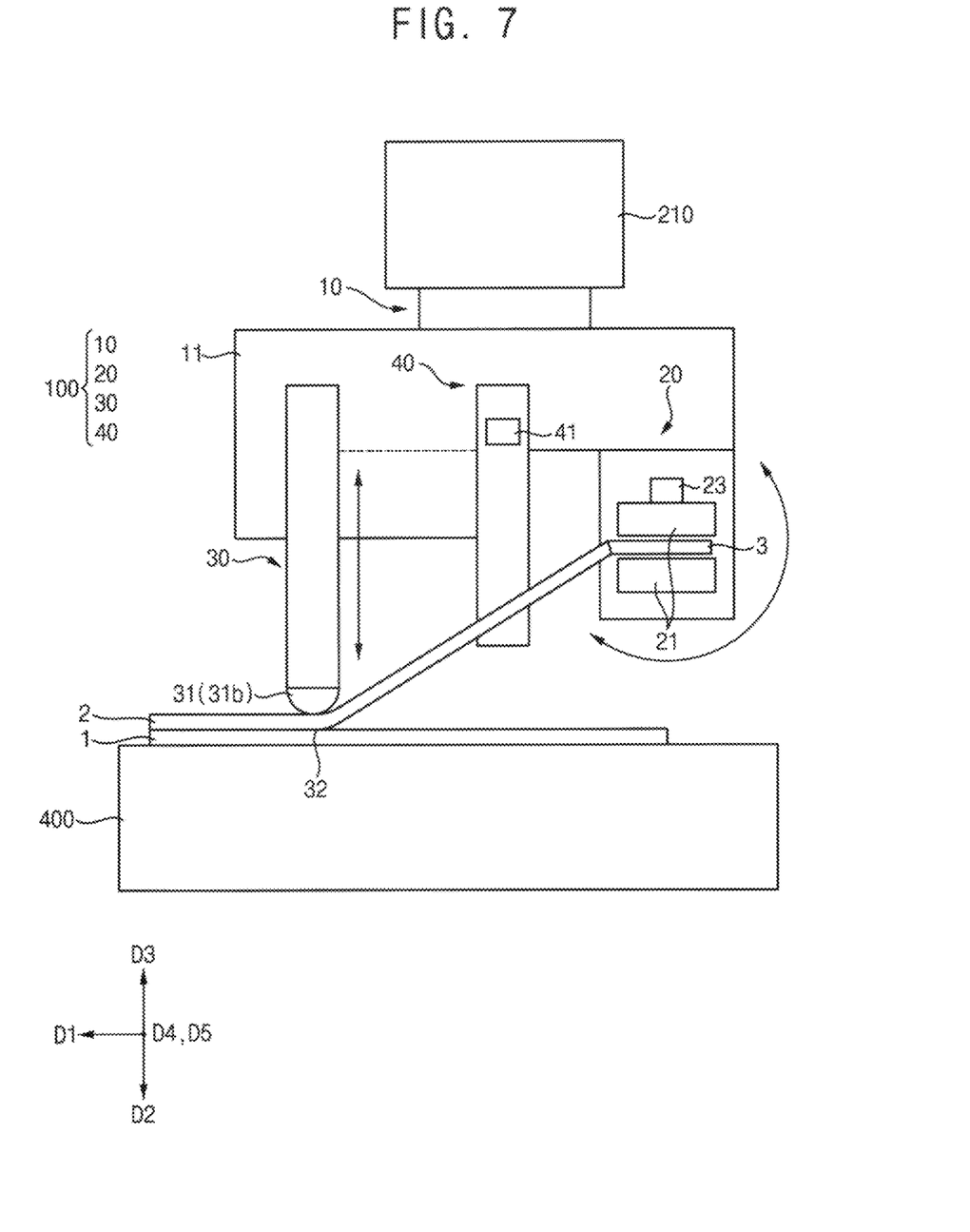

FIGS. 6 and 7 are front views illustrating an embodiment of the peeling module of FIG. 5.

Referring to FIGS. 6 and 7, the second frame 20 may include a gripper 21 and a first sensor 23.

The gripper 21 may grip the film 2 attached to the object 1 to remove the film 2 from the object 1. In an embodiment, the film 2 may include a protruding end 3, and the gripper 21 may grip the protruding end 3, for example.

The first sensor 23 may be provided on the gripper 21 and may detect whether the gripper 21 is gripped.

In an embodiment, the first sensor 23 may be a first pressure sensor that senses a pressure applied by the gripper 21 to the film 2.

In another embodiment, the first sensor 23 may be a first photosensor detecting whether the film 2 is close to the first sensor 23 within a predetermined distance.

However, a position, a size, and a shape of the first sensor 23 are not limited by FIGS. 6 and 7.

As described above, each of the second frame 20, the third frame 30, and the fourth frame 40 may be connected to the first frame 10. In an embodiment, as illustrated in FIGS. 6 and 7, each of the second frame 20, the third frame 30, and the fourth frame 40 may be connected to the first frame 10 through a connecting member 11, for example.

Figure 8:
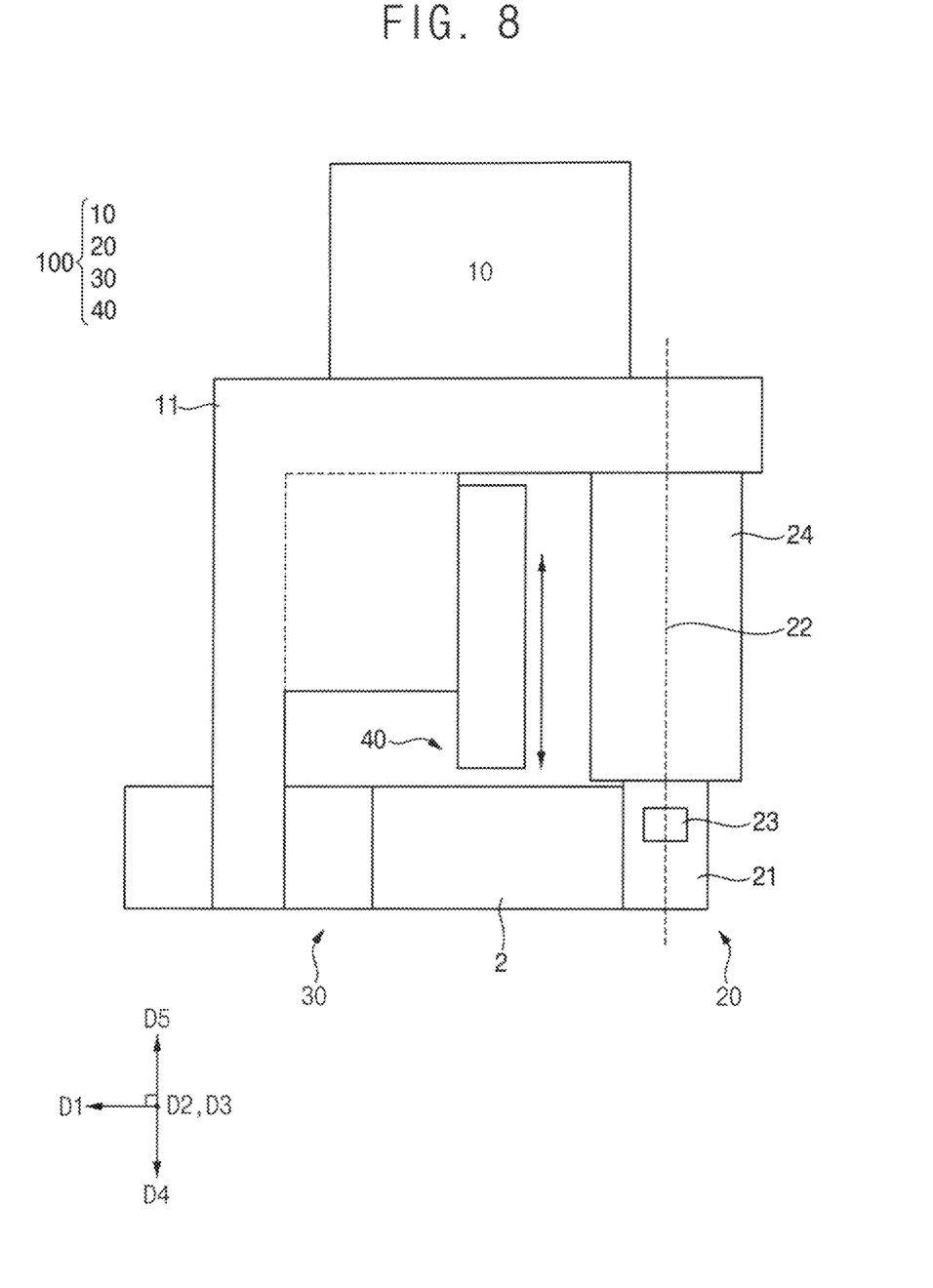
FIGS. 8 and 9 are plan views illustrating an embodiment of the peeling module of FIG. 5.
Figure 9:
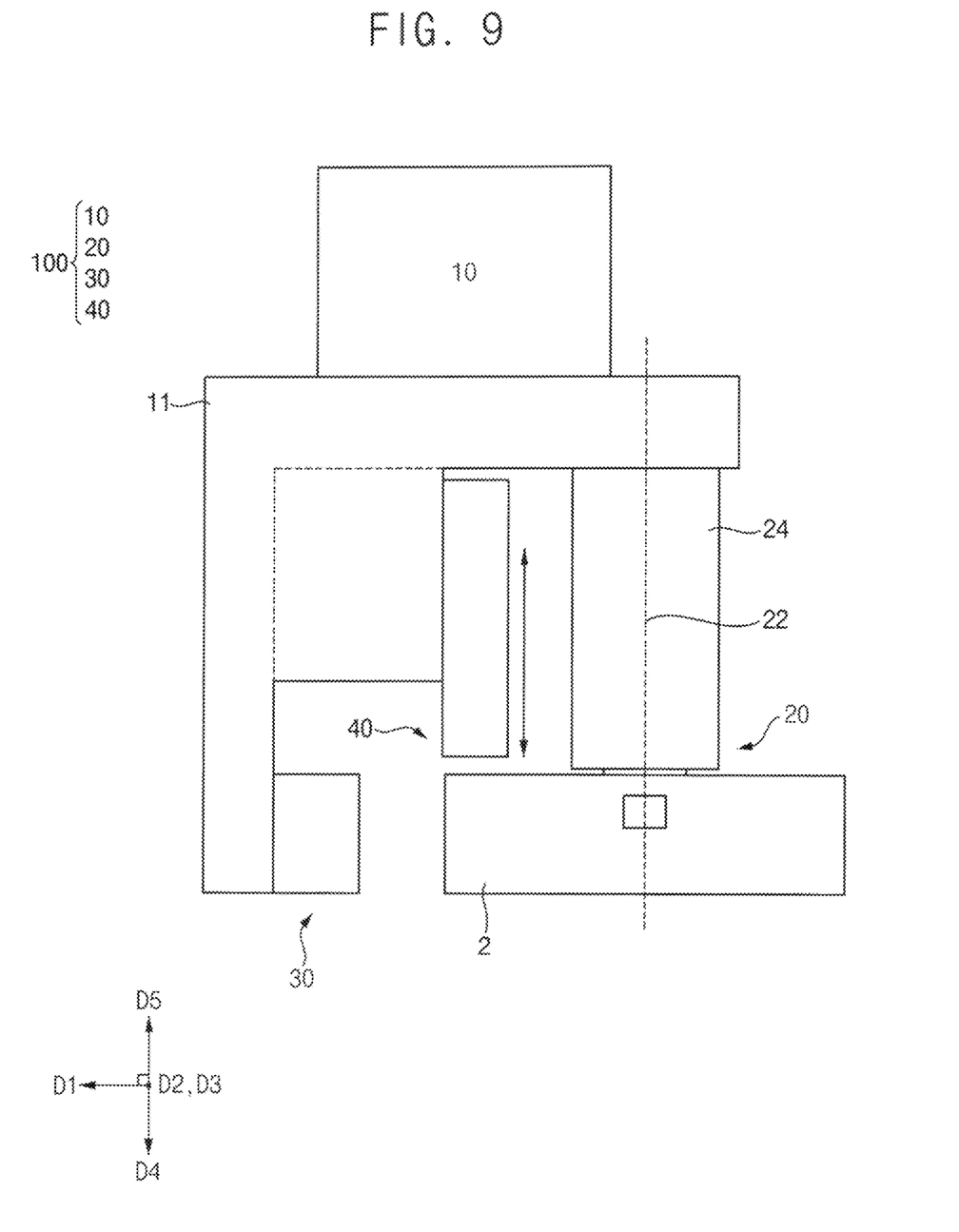

FIGS. 8 and 9 are plan views illustrating an embodiment of the peeling module of FIG. 5.

Referring to FIGS. 8 and 9, the second frame 20 may rotate around a rotation axis 22 of a rotation body 24 connecting the first frame 10 and the gripper 21 through the connecting member 11. In an embodiment, the rotating axis 22 may connect the first frame 10 and the gripper 21 through the connecting member 11, and the second frame 20 may rotate around the rotating axis 22, for example. Accordingly, when the gripper 21 grips the film 2, the second frame 20 may rotate about the rotation axis 22 to wind the film 2 around the gripper 21. In other words, the second frame 20 may perform grip and rotation at the same time.

A motor (not illustrated) connected to the rotation axis 22 may rotate the second frame 20.

As illustrated in FIGS. 6 and 7, when viewed from a front of the peeling module 100, the rotation axis 22 connecting the first frame 10 and the gripper 21 may not move. Likewise, as illustrated in FIGS. 8 and 9, when viewed from a top of the peeling module 100, the rotation axis 22 connecting the first frame 10 and the gripper 21 may not move. In other words, in a three-dimensional Cartesian coordinate system fixed with respect to the peeling module 100, the rotation axis 22 may be fixed.

As illustrated in FIGS. 8 and 9, when viewed from the top of the peeling module 100, the third frame 30 may be spaced apart from the second frame 20 in a first direction D1 perpendicular to the rotation axis 22.

As illustrated in FIGS. 6 and 7, when viewed from the front of the peeling module 100, the third frame 30 may move in a second direction D2 toward the film 2 and a third direction D3 opposite to the second direction D2.

In an embodiment, when viewed from the front of the peeling module 100, the second direction D2 may be perpendicular to the first direction D1 and the rotation axis 22. Similarly, when viewed from the top of the peeling module 100, the second direction D2 may be perpendicular to the first direction D1 and the rotation axis 22. In other words, in a three-dimensional Cartesian coordinate system fixed with respect to the peeling module 100, the second direction D2 may be perpendicular to the first direction D1 and the rotation axis 22.

As illustrated in FIGS. 6 and 7, the third frame 30 may include a pressing part 31.

The pressing part 31 may press the film 2 while a peeling process is performed.

In an embodiment, as illustrated in FIG. 6, the pressing part 31 may be a roller 31a. In an embodiment, the roller 31a of the third frame 30 may press the film 2. In addition, when viewed from the front of the peeling module 100, the third frame 30 may move in the second direction D2 to make rolling contact with the film 2, for example. In an embodiment, the roller 31a of the third frame 30 may be in rolling contact with the film 2. In this case, the third frame 30 may define a boundary 32 at which the film 2 to be removed is peeled from the object 1, for example.

In another embodiment, as illustrated in FIG. 7, the pressing part 31 may be a curved surface 31b included in the third frame 30. In an embodiment, the curved surface 31b of the third frame 30 may press the film 2. In addition, when viewed from the front of the peeling module 100, the third frame 30 may move in the second direction D2 to be in sliding contact with the film 2, for example. In an embodiment, the curved surface 31b of the third frame 30 may be in sliding contact with the film 2. In this case, the third frame 30 may define the boundary 32, for example.

The boundary 32 defined by the third frame 30 may vary with time. A detailed description thereof will be given with reference to FIG. 13.

When viewed from the front of the peeling module 100, the third frame 30 may move in the third direction D3 after moving in the second direction D2. In other words, when viewed from the front of the peeling module 100, the third frame 30 may reciprocate.

The fourth frame 40 may be disposed between the second frame 20 and the third frame 30.

As illustrated in FIGS. 8 and 9, when viewed from the top of the peeling module 100, the fourth frame 40 may move in a fourth direction D4 away from the first frame 10 and in a fifth direction D5 opposite to the fourth direction D4.

In an embodiment, when viewed from the front of the peeling module 100, the fourth direction D4 may be parallel to the rotation axis 22. Similarly, when viewed from the top of the peeling module 100, the fourth direction D4 may be parallel to the rotation axis 22. In other words, in a three-dimensional Cartesian coordinate system fixed with respect to the peeling module 100, the fourth direction D4 may be parallel to the rotation axis 22.

Figure 10:
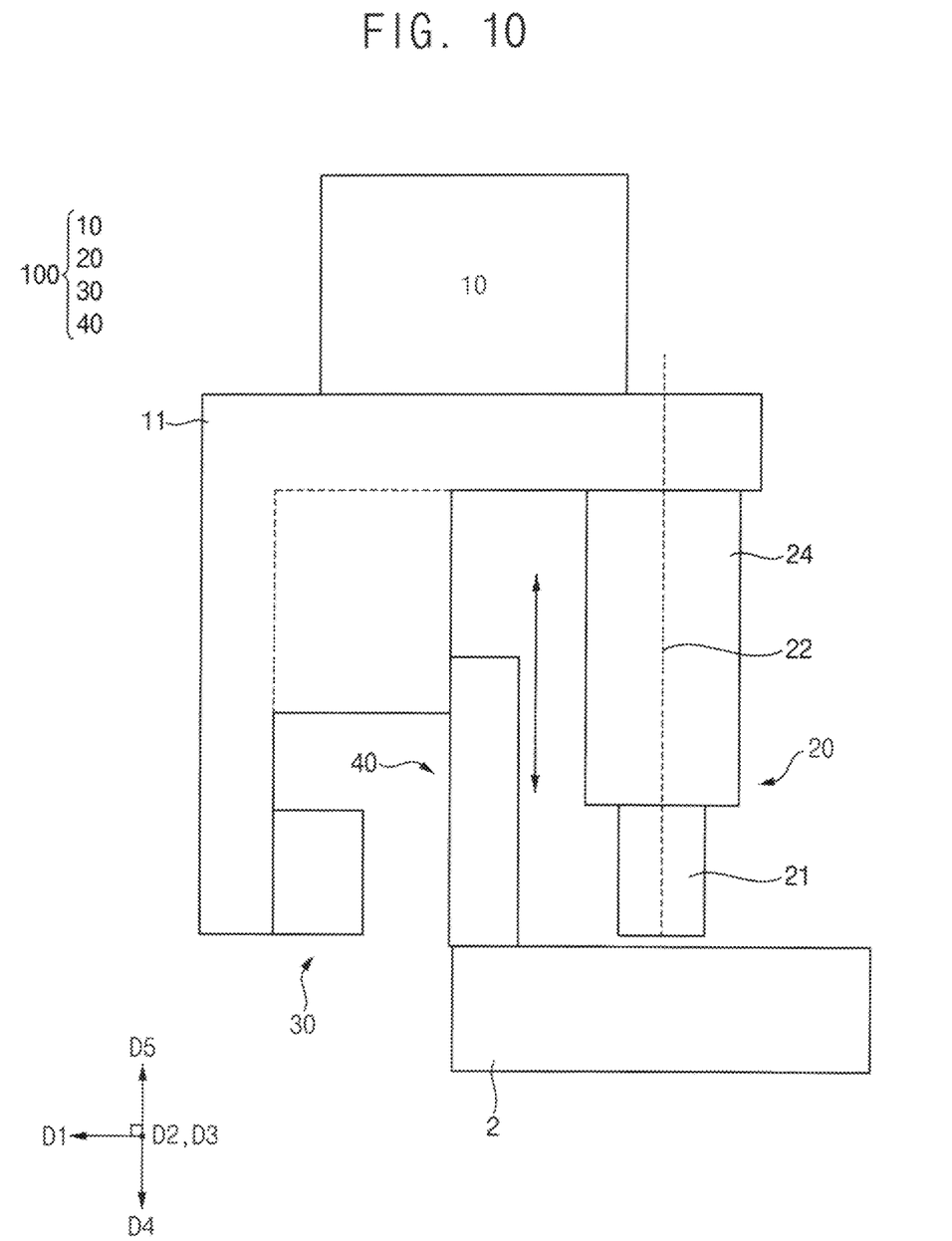
FIG. 10 is a plan view illustrating an embodiment of the peeling module of FIG. 5

FIG. 10 is a plan view illustrating an embodiment of the peeling module of FIG. 5.

Referring to FIG. 10, when viewed from the top of the peeling module 100, the fourth frame 40 may move in the fourth direction D4 to separate the film 2 wound around the gripper 21 of the second frame 20 from the gripper 21.

When viewed from the top of the peeling module 100, the fourth frame 40 may move in the fifth direction D5 after moving in the fourth direction D4. In other words, when viewed from the top of the peeling module 100, the fourth frame 40 may reciprocate.

In an embodiment, the film 2 may freely fall after being separated from the gripper 21. In an embodiment, when viewed from the front of the peeling module 100, the film 2 may move in the second direction D2 after being separated from the gripper 21, for example.

In an embodiment, a storage means (not illustrated) for storing the film 2 may be disposed under the second frame 20.

As illustrated in FIGS. 6 and 7, the fourth frame 40 may include a second sensor 41 detecting whether the gripper 21 and the film 2 are separated.

In an embodiment, the second sensor 41 may be a second pressure sensor that senses a pressure applied to the film 2 by the fourth frame 40.

In another embodiment, the second sensor 41 may be a second photosensor detecting whether the film 2 is close to the second sensor 41 within a predetermined distance.

However, the position, size, and shape of the second sensor 41 are not limited by FIGS. 6 and 7.

As illustrated in FIGS. 1, 3, 6, 7, and 10, the controller 300 may be electrically connected to each of the peeling module 100, the articulated robot 200, the first sensor 23 and the second sensor 41, and the peeling module 100 may be possible to control the operation of the articulated robot 200. In an embodiment, when the gripper 21 of the second frame 20 does not grip the film 2, the controller 300 may stop the peeling process, for example. In an embodiment, when the fourth frame 40 does not separate the gripper 21 and the film 2, the controller 300 may stop the peeling process, for example.

Figure 11:
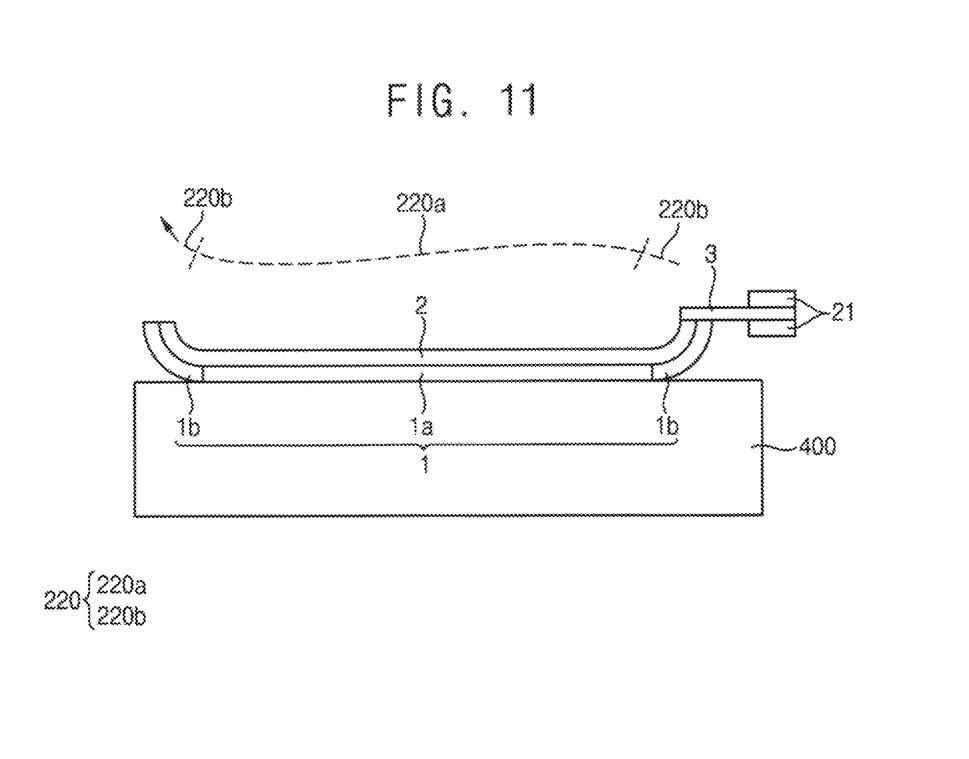
FIGS. 11 to 13 are views illustrating a path along which the peeling module of FIG. 5 moves.
Figure 12:
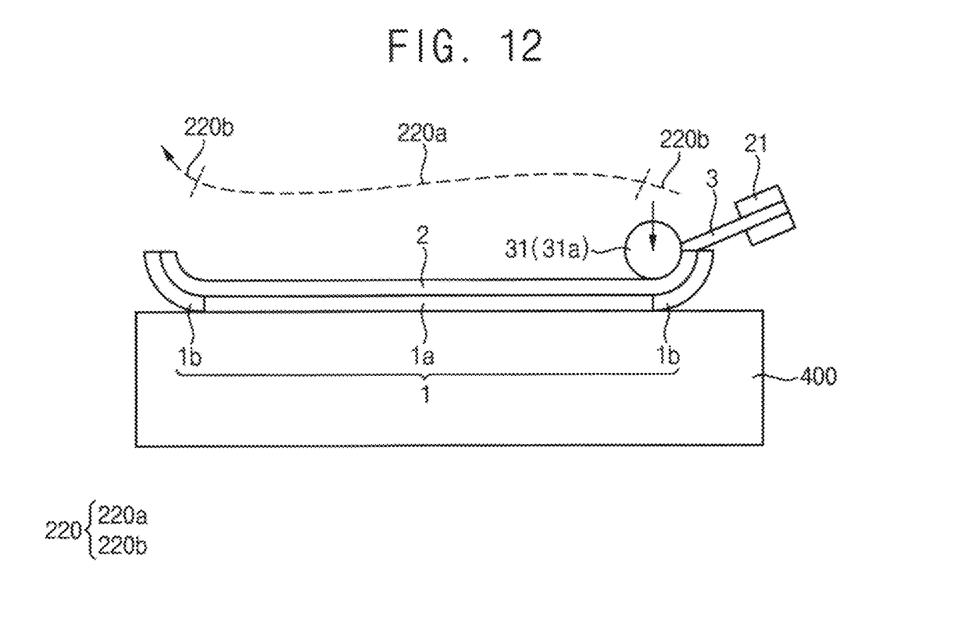
Figure 13:
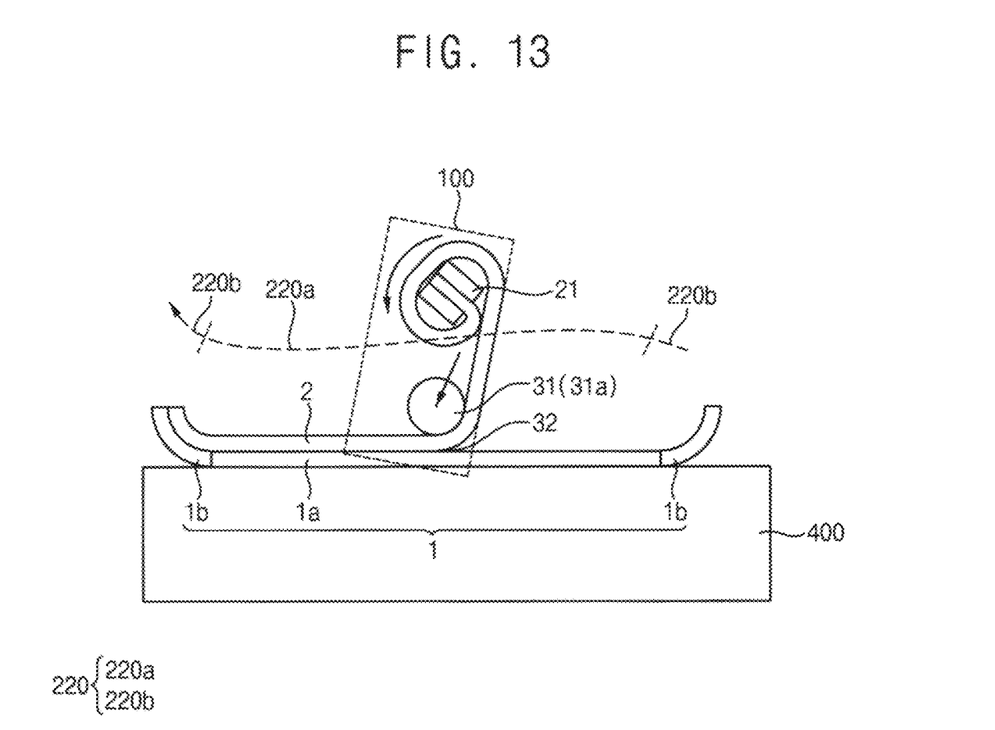

FIGS. 11 to 13 are views illustrating a path along which the peeling module of FIG. 5 moves.

Referring to FIGS. 3, 4 and 11 to 13, the first frame 10 may be connected to the articulated arm 210 of the articulated robot 200. Accordingly, the peeling module 100 may be constrained to the articulated robot 200. The articulated robot 200 may move the peeling module 100 to the preset path (also referred to as a path for convenience) 220. In addition, the articulated robot 200 may move the peeling module 100 to a position before moving to the path 220.

In an embodiment, the object 1 from which the film 2 is to be removed may include a planar area 1a and a curved area 1b. In this case, The path 220 through which the articulated robot 200 moves the peeling module 100 may include a first path 220a corresponding to the flat area 1a and a second path 220b corresponding to the curved area 1b. Accordingly, a peeling process suitable for the shape of the object 1 from which the film 2 is to be removed may be performed. Accordingly, it is possible to reduce damage to the object 1 from which the film 2 is to be removed.

As illustrated in FIG. 11, the gripper 21 may grip the film 2 attached to the object 1 and to be removed from the object 1. In an embodiment, the film 2 may include the protruding end 3, and the gripper 21 may grip the protruding end 3, for example.

In an embodiment, as illustrated in FIGS. 6, 12 and 13, the pressing part 31 may be the roller 31a. In an embodiment, the roller 31a of the third frame 30 may press the film 2, for example. In addition, when viewed from the front of the peeling module 100, the third frame 30 may move in the second direction D2 to make rolling contact with the film 2. In an embodiment, the roller 31a of the third frame 30 may be in rolling contact with the film 2, for example. In this case, the third frame 30 may define a boundary 32 at which the film 2 to be removed is peeled from the object 1.

In another embodiment, as shown in FIG. 7, the pressing part 31 may be the curved surface 31b included in the third frame 30. In an embodiment, the curved surface 31b of the third frame 30 may press the film 2, for example. In addition, when viewed from the front of the peeling module 100, the third frame 30 may move in the second direction D2 to be in sliding contact with the film 2. In an embodiment, the curved surface 31b of the third frame 30 may be in sliding contact with the film 2. In this case, the third frame 30 may define the boundary 32, for example.

as shown in FIGS. 6 and 13, the second frame 20 may wind the film 2 around the gripper 21. In addition, the articulated robot 200 may move the peeling module 100 to the preset path 220. Accordingly, a position at which the pressing part 31 of the third frame 30 presses the film 2 may vary with time. Accordingly, the boundary 32 may vary over time.

Figure 14:
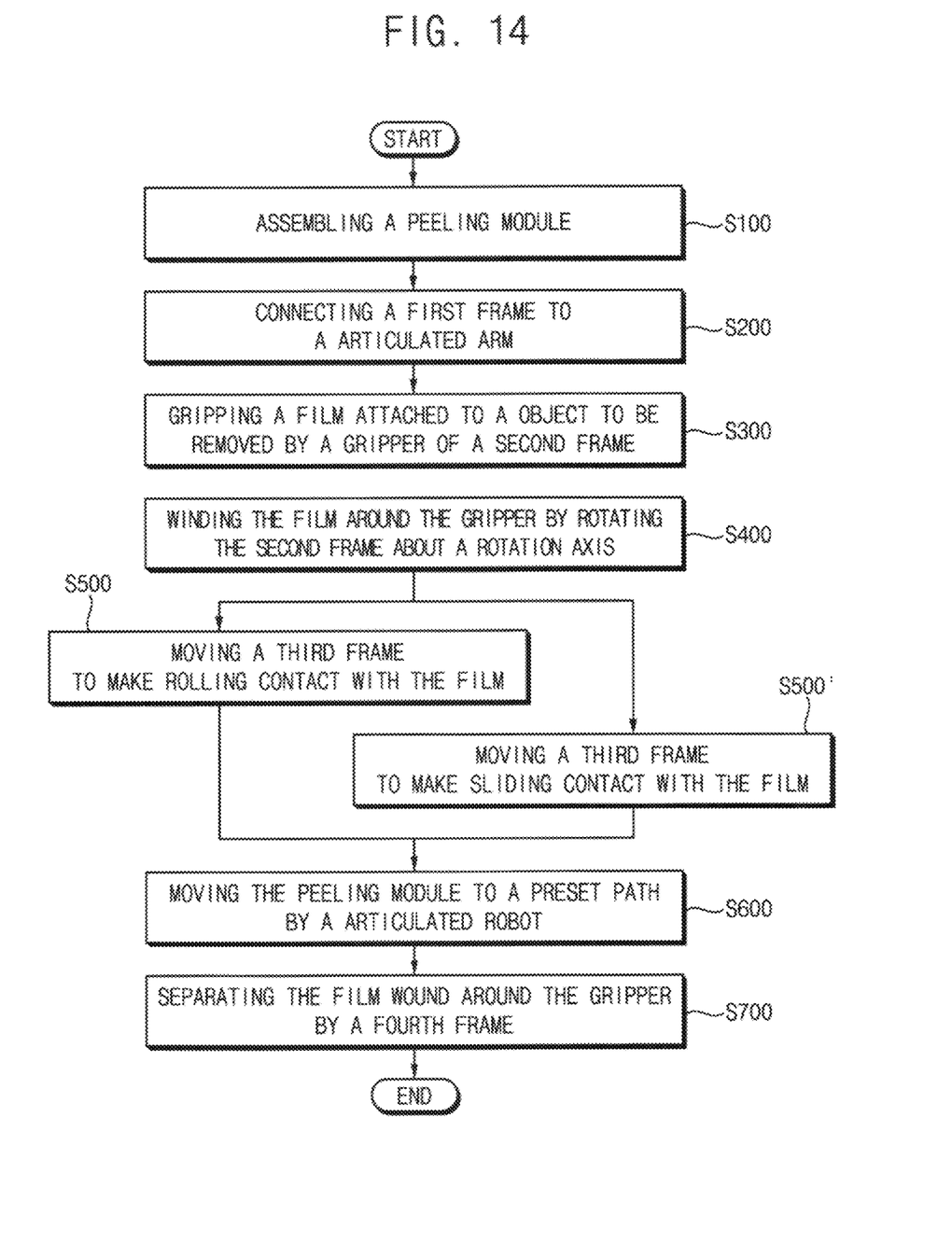
FIG. 14 is a flowchart illustrating an embodiment of a film peeling method according to the invention.

FIG. 14 is a flowchart illustrating an embodiment of a film peeling method according to the invention.

Hereinafter, an embodiment of performing a film peeling method using the film peeling apparatus 1000 described with reference to FIGS. 3 to 13 will be described, but the invention is not limited thereto.

Referring to FIG. 14, the film peeling method in an embodiment of the invention may include assembling the peeling module 100 (S100), connecting the first frame 10 of the peeling module 100 to the articulated arm 210 of the articulated robot 200 (S200), gripping the film 2 attached to the object 1 and to be removed by the gripper 21 of the second frame 20 (S300), winding the film 2 around the gripper 21 by rotating the second frame 20 about the rotation axis 22 (S400), when viewed from the front of the peeling module 100, moving the third frame 30 in the second direction D2 to make rolling contact with the film 2 (S500), the articulated robot 200 moves the peeling module 100 to the preset path 220 (S600), when viewed from the top of the peeling module 100, the fourth frame 40 may move in the fourth direction D4 to remove the film 2 wound around the gripper 21 of the second frame 20 (S700).

However, the film peeling method may include moving the third frame 30 in the second direction D2 to make sliding contact with the film 2 (S500') instead of moving the third frame 30 in the second direction D2 to make rolling contact with the film 2 (S500). A detailed description thereof will be given later.

First, the peeling module 100 may be assembled (S100). The peeling module 100 may include the first frame 10, the second frame 20, the third frame 30, and the fourth frame 40.

Next, the first frame 10 of the peeling module 100 may be connected to the articulated arm 210 of the articulated robot 200 (S200). Accordingly, the peeling module 100 may be constrained to the articulated robot 200.

Next, an operation may be divided according to whether the pressing part 31 included in the third frame 30 is the roller 31a or the curved surface 31b.

In an embodiment, as shown in FIGS. 6, 12 and 13, the pressing part 31 may be the roller 31a. In an embodiment, the roller 31a of the third frame 30 may press the film 2, for example. In this case, the second frame 20 may rotate about the rotation axis 22 to wind the film 2 around the gripper 21 (S400), and when viewed from the front of the peeling module 100, the third frame 30 may move in the second direction D2 to make rolling contact with the film 2 (S500), and the articulated robot 200 may move the peeling module 100 to the predetermined path 220 (S600), for example. In this case, the third frame 30 may define the boundary 32 at which the film 2 to be removed is peeled from the object 1.

In another embodiment, as shown in FIG. 7, the pressing part 31 may be the curved surface 31b included in the third frame 30. In an embodiment, the curved surface 31b of the third frame 30 may press the film 2, for example. In this case, the second frame 20 may rotate about the rotation axis 22 to wind the film 2 around the gripper 21 (S400), and when viewed from the front of the peeling module 100, the third frame 30 moves in the second direction D2 to make sliding contact with the film 2 (S500'), and the articulated robot 200 may move the peeling module 100 to the preset path 220 (S600). In this case, the third frame 30 may define the boundary 32 at which the film 2 to be removed is peeled from the object 1.

As described above, the second frame 20 may wind the film 2 around the gripper 21. In addition, the articulated robot 200 may move the peeling module 100 to the preset path 220. Accordingly, the position at which the pressing part 31 of the third frame 30 presses the film 2 may vary with time. Accordingly, the boundary 32 may vary over time.

Next, as shown in FIG. 10, when viewed from the top of the peeling module 100, the fourth frame 40 may move in the fourth direction D4 to remove the film 2 wound around the gripper 21 of the second frame 20 (S700).

As described above, when viewed from the front of the peeling module 100, the third frame 30 may move in the third direction D3 after moving in the second direction D2. In other words, when viewed from the front of the peeling module 100, the third frame 30 may reciprocate. In addition, when viewed from the top of the peeling module 100, the fourth frame 40 may move in the fifth direction D5 after moving in the fourth direction D4. In other words, when viewed from the top of the peeling module 100, the fourth frame 40 may reciprocate. In addition, the articulated robot 200 may move the peeling module 100 to a position before moving to the path 220. Accordingly, a peeling process may be repeatedly performed.

As described above, the first frame 10 may be connected to each of the second frame 20, the third frame 30, and the fourth frame 40. The second frame 20 may include the gripper 21. The second frame 20 may wind the film 2 around the gripper 21. In addition, the third frame 30 may define a boundary 32 at which the film 2 to be removed is peeled from the object 1. In addition, the articulated robot 200 may move the peeling module 100 to the preset path 220. Accordingly, a footprint desired for a peeling process may be reduced.

The fourth frame 40 may remove the film 2 wound around the gripper 21.

In an embodiment, the object 1 from which the film 2 is to be removed may include the planar area 1a and the curved area 1b. In this case, the path 220 through which the articulated robot 200 moves the peeling module 100 may include a first path 220a corresponding to the flat area 1a and a second path 220b corresponding to the curved area 1b. Accordingly, a peeling process suitable for the shape of the object 1 from which the film 2 is to be removed may be performed. Accordingly, it is possible to reduce damage to the object 1 from which the film 2 is to be removed.

Although embodiments and implementations have been described herein, other embodiments and modifications will be apparent from this description. Accordingly, the invention is not limited to such embodiments, but rather to the broader scope of the appended claims and various obvious modifications and equivalent arrangements as would be apparent to a person of ordinary skill in the art.

What is claimed is:

1. A film peeling apparatus for peeling a film from an object, the film peeling apparatus comprising:
   a peeling module including:
      a first frame;
      a second frame connected to the first frame and including a rotation body and a gripper which grips the film attached to the object and to be removed from the object, and is rotatable about a rotation axis of the rotation body connecting the first frame and the gripper; and
      a third frame defining a boundary at which the film to be removed is peeled from the object; and
   an articulated robot including an articulated arm connected to the first frame,
   wherein the rotation body overlaps the gripper in a direction which is parallel to a main plane extension direction of the film and the second frame rotates about the rotation axis so that the film is wound around an entirety of an outer surface of the gripper when the gripper grips the film.

2. The film peeling apparatus of claim 1, wherein the articulated robot moves the peeling module along a preset path.

3. The film peeling apparatus of claim 1, wherein when viewed from a top of the peeling module, the third frame is spaced apart from the second frame in a first direction perpendicular to the rotation axis, and
   when viewed from a front of the peeling module, the third frame is movable in a second direction perpendicular to the first direction and facing the film and in a third direction opposite to the second direction.

4. The film peeling apparatus of claim 3, wherein the third frame includes a roller which presses the film, and
   the roller is in rolling contact with the film.

5. The film peeling apparatus of claim 3, wherein the third frame includes a curved surface which presses the film, and
   the curved surface is in sliding contact with the film.

6. The film peeling apparatus of claim 3, further comprising:
   a fourth frame connected to the first frame and disposed between the second frame and the third frame,
   wherein when viewed from the top of the peeling module, the fourth frame is movable in a fourth direction parallel to the rotation axis and away from the first frame and in a fifth direction opposite to the fourth direction.

7. The film peeling apparatus of claim 6, wherein when viewed from the top of the peeling module, the fourth frame moves in the fourth direction to separate the film wound around the gripper of the second frame from the gripper.

8. The film peeling apparatus of claim 7, wherein the second frame further includes a first sensor which detects whether the gripper is gripped, and
   the fourth frame includes a second sensor which detects whether the gripper and the film are separated.

9. The film peeling apparatus of claim 8, further comprising:
   a controller which is electrically connected to each of the peeling module, the articulated robot, the first sensor, and the second sensor, and controls an operation of the peeling module and the articulated robot.

* * * * *